(12) United States Patent
Kunze et al.

(10) Patent No.: US 6,520,418 B2
(45) Date of Patent: Feb. 18, 2003

(54) THERMOSTATIC VALVE WITH AN ANNULAR SLIDE

(75) Inventors: Jürgen Kunze, Rutesheim (DE); Immanuel Buschatz, Unterensingen (DE)

(73) Assignee: Behr Thermot-tronik GmbH (DE)

( * ) Notice: Subject to any disclaimer, the term of this patent is extended or adjusted under 35 U.S.C. 154(b) by 0 days.

(21) Appl. No.: 10/055,409

(22) Filed: Jan. 23, 2002

(65) Prior Publication Data

US 2002/0096571 A1 Jul. 25, 2002

(30) Foreign Application Priority Data

Jan. 23, 2001 (DE) .......................... 101 04 179

(51) Int. Cl.[7] .............................. G05D 23/12; F01P 7/02
(52) U.S. Cl. .................................. 236/34.5; 236/99 K
(58) Field of Search ....................... 236/34.5, 34, 93 A, 236/99 J, 99 K

(56) References Cited

U.S. PATENT DOCUMENTS

| | | | | |
|---|---|---|---|---|
| 2,847,165 A | * | 8/1958 | Freismuth | 236/101 R |
| 2,919,860 A | * | 1/1960 | Wagner | 236/34.5 |
| 3,129,885 A | * | 4/1964 | Freismuth | 236/34.5 |
| 4,426,036 A | * | 1/1984 | Sliger | 236/34.5 |
| 4,763,834 A | * | 8/1988 | Duprez | 236/34.5 |
| 6,343,746 B2 | * | 2/2002 | Chamot et al. | 236/34.5 |

FOREIGN PATENT DOCUMENTS

| | | |
|---|---|---|
| DE | 1 080 829 A | 4/1960 |
| DE | 1 911 822 U | 3/1965 |
| DE | 1775 816 A | 1/1972 |
| DE | 32 40 939 A1 | 5/1983 |
| DE | 42 43 228 A1 | 6/1994 |

OTHER PUBLICATIONS

German Search Report.

* cited by examiner

Primary Examiner—William E. Tapolcai
(74) Attorney, Agent, or Firm—Kennedy Covington Lobdell & Hickman, LLP

(57) ABSTRACT

An improved thermostatic valve has an axially open annular slide and a base plate which together form a gasket seat, and has a restoring spring, which biases the annular slide in the direction toward the base plate. The restoring spring is mounted upon an abutment that is connected to the base plate instead of to the valve housing. The configuration of the claimed invention permits a thermostatic valve that may be assembled and tested prior to installation on an internal combustion engine.

6 Claims, 1 Drawing Sheet

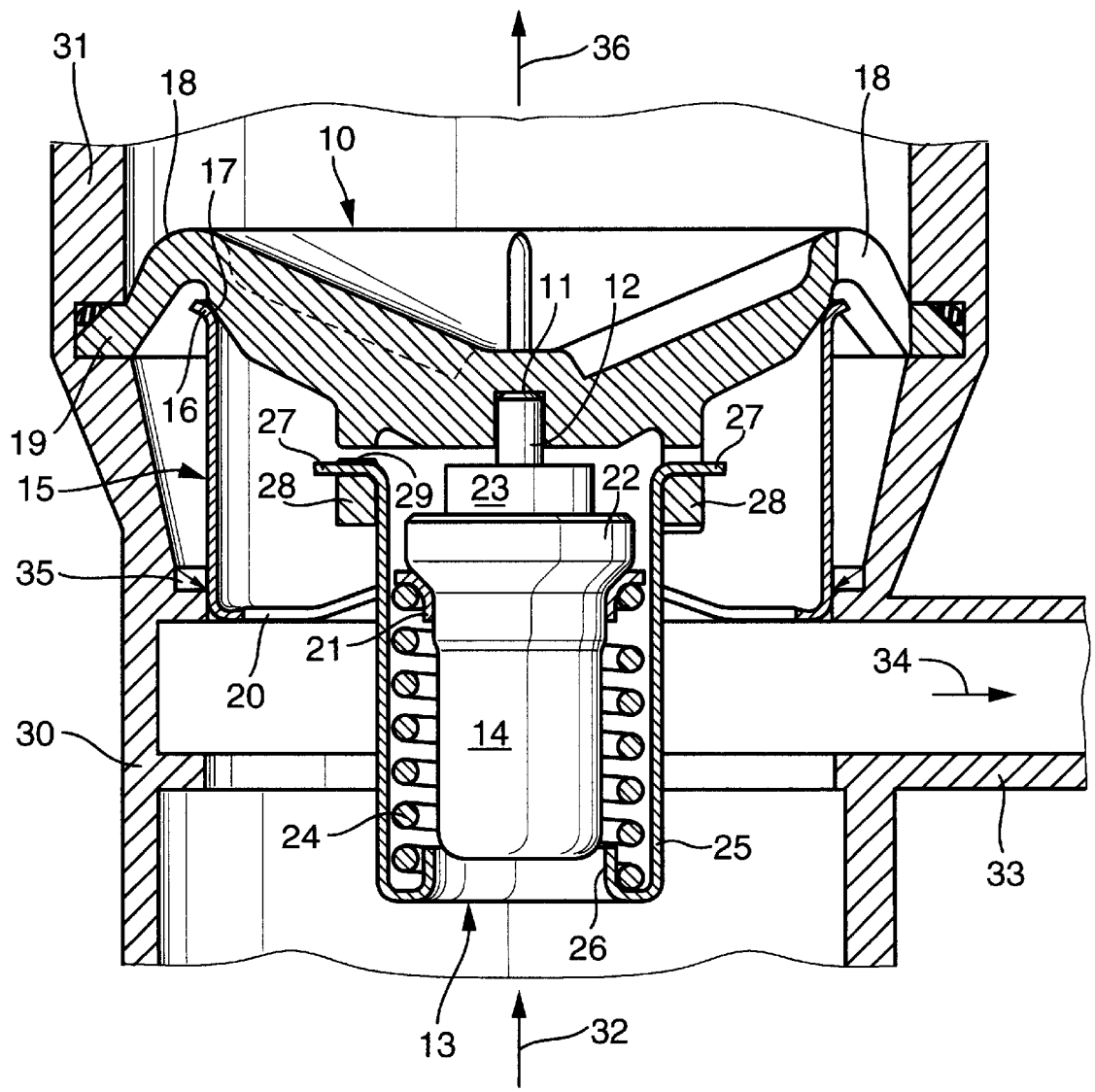

THERMOSTATIC VALVE WITH AN ANNULAR SLIDE

CROSS-REFERENCES TO RELATED APPLICATIONS

This application claims the benefit of German patent application 10104179.9, filed Jan. 23, 2001, herein incorporated by reference.

FIELD OF THE INVENTION

The invention relates to thermostatic valves, and particularly to a thermostatic valve that includes an axially open annular slide that can be displaced by means of a thermostatic operating element; a base plate that, together with an edge of the annular slide, forms a gasket seat and has a clamping edge and openings between the clamping edge and the gasket seat; a restoring spring, which biases the annular slide in the direction of the base plate; and an abutment for the restoring spring.

BACKGROUND OF THE INVENTION

In typical thermostatic valves, a movable valve plate is driven by a thermostatic operating element between a closed position and an open position according to the temperature of the fluid being conveyed through the valve. Such valves provide for fairly precise control of coolant flow according to a desired operating temperature of the device, such as an internal combustion engine, which is being cooled. When a large-volume flow of coolant is required, however, known thermostatic valves present a number of disadvantages, chief among them the loss of coolant pressure because the coolant impinges upon the valve plate.

In those cases in which large volume flows of coolant are required for cooling an engine, a thermostatic valve of the type mentioned at the outset is employed in place of a thermostatic valve that operates by means of a valve plate. In such annular slide thermostatic valves, an axial coolant flow passes through the annular slide during operation, and specifically when coolant is being conveyed to a radiator. Because the coolant does not impinge upon a valve plate, the pressure loss is fairly small.

Such known thermostatic valves are typically supplied in parts and then assembled during installation in the coolant circuit of an internal combustion engine. Assembly in situ is required because the restoring spring for the annular slide and thermostatic operating element is supported on a cross arm, which is in turn supported on the housing on which the thermostatic valve is mounted. Because the parts are potentially fairly small and require precise alignment during assembly, it is desirable to have a thermostatic valve that is capable of being pre-assembled.

OBJECT AND SUMMARY OF THE INVENTION

It is therefore an object of the present invention to provide for an improved thermostatic valve which provides for larger-volume coolant flows and is capable of being installed in a pre-assembled state.

Specifically, the present invention provides for a thermostatic valve whose restoring spring is mounted on the base plate of the valve.

Because the restoring spring is mounted on the base plate of the valve rather than on a cross arm which must be supported on the valve housing, the present invention makes it possible to pre-assemble the elements of the thermostatic valve into a component which can, in turn, be mounted between two parts of a housing or the like. In addition to reducing the costs of installation, pre-assembly of the valve makes it possible to check the seal between the annular slide and the base plate before installation.

In one embodiment of the invention, a shackle, the ends of whose legs are fastened on shoulders of the base plate, is used as the abutment for the restoring spring. It is helpful to design the shoulders of the base plate as open hooks, which engage with the ends of the legs of the shackle. This feature simplifies the pre-assembly process, because the shackle and restoring spring may be easily mounted by pushing and rotating the shackle.

In another embodiment of the invention, the shackle may be equipped with a collar, which serves to guide the housing of the thermostatic operating element. Such a collar provides a means by which the thermostatic operating element may be aligned with the shackle.

In still another embodiment of the invention, the end of the annular slide facing away from the gasket seat is provided with strips which are essentially oriented radially inward and hold a mounting, which fixes the annular slide in place on the housing of the thermostatic operating element. In this embodiment it is advantageous to design the mounting as a circumferential ring, which is supported in the axial direction on an annular shoulder of the housing of the thermostatic operating element, because the connection between the annular slide and the housing of the thermostatic operating element is thereby made easily and securely.

Further characteristics and advantages of the invention will be seen in the following description of the thermostatic valve, in accordance with the invention represented in the drawing.

BRIEF DESCRIPTION OF THE DRAWING

The single drawing FIGURE is an axial cross-sectional view of a thermostatic valve in accordance with the present invention.

DETAILED DESCRIPTION OF THE PREFERRED EMBODIMENT

The thermostatic valve represented in the drawing has a base plate 10, which is used as a support element for the remaining parts of the thermostatic valve. A cutout 11 is provided in the center of the base plate, into which a work piston 12 of a thermostatic operating element 13 has been inserted. The housing 14 of the thermostatic operating element is connected to an annular slide 15. The annular slide 15 has an essentially cylindrical shape. The edge 16 of annular slide 15 that faces base plate 10 is slightly widened toward the exterior and sealingly engages with a contact face of base plate 10, forming a gasket seat 17. As can be seen from the drawing, the two faces constituting the gasket seat 17 are obliquely inclined at approximately 45° and widen in the direction of flow.

Base plate 10 is bowl-shaped and arches toward thermostatic operating element 13. Gasket seat 17 is located in the edge area of the underside of this bowl. Connecting strips 18 adjoin the bowl-shaped area and extend radially toward the exterior. Preferably three strips 18 are arranged at spacings of 120° around the circumference of the base plate 10 and thereby define apertures through which coolant may flow. These strips 18 lead to a clamping edge 19, which is in the shape of a circumferentially closed ring. A relatively large free-flow cross-section exists between gasket seat 17 and clamping edge 19 and is only interrupted by connecting strips 18.

The edge of annular slide 15 that faces away from gasket seat 17 is provided with inwardly directed connecting strips 20, whose inner ends make a transition into a ring-shaped holder 21. Ring-shaped holder 21 of annular slide 15 rests against an annular collar 22 of housing 14 of thermostatic operating element 13 on the side located opposite work piston 12. Guide insert 23 is received in the housing 14 in the area of this annular collar 22 and, on one hand, constitutes a guide for operating piston 12 and, on the other hand, is used for the sealed clamping of a bag diaphragm, which seals the interior of the housing 14 from the outside. An expanding material, which may be a wax mixture, is located in housing 14 and is designed so that, at a pre-selected temperature, it expands and drives out the work piston.

With the extension of work piston 12, housing 14 of thermostatic operating element 13 is moved away from base plate 10, taking along annular slide 15 so that edge 16 of annular slide 15 comes free of gasket seat 17.

A restoring spring 24 is assigned to housing 14 of thermostatic operating element 13 and is biased against the extension of work piston 12 (i.e. to urge annular slide 15 toward base plate 10). When the coolant temperature (and thus the temperature of the thermostatic operating element 13) falls, the wax mixture contained in housing 14 contracts. Restoring spring 24 is therefore able to push housing 14 back and force work piston 12 back into housing 14. The restoring spring 24 is supported at one end on holder 21 of annular slide 15, so that holder 21 is securely maintained on housing 14 of thermostatic operating element 13, while annular slide 15 is biased in the direction of the base plate 10 at the same time. The other end of restoring spring 24, which is pre-stressed to a pre-selected force, is supported by means of a shackle-shaped abutment 25. Shackle 25 is provided with a collar 26, which serves to center shackle 25 with housing 14 of thermostatic operating element 13 as well as to provide a seat for the restoring spring 24. Ends 27 of the legs of shackle 25, which legs are oriented toward base plate 10, are angled toward the exterior and received and suspended in hooks 28 which project from base plate 10. Hooks 28 are open, so that ends 27 of the legs of shackle 25 can be suspended from the hooks 28 by rotating them about the longitudinal axis of the thermostatic operating element 13.

The thermostatic valve, which includes base plate 10, thermostatic operating element 13, annular slide 15 and shackle 25, is pre-assembled from these elements to form a component. As the last step shackle 25 is inserted between strips 20 of annular slide 15, in the course of which restoring spring 24 is compressed. By rotating shackle 25, the angled ends 27 of the legs of shackle 25 are suspended in hooks 28, which extend as shoulders from base plate 10, to complete pre-assembly of the thermostatic valve. As can be seen from the drawing, protrusions 29 are provided at the ends of the slits of the hooks 28, so that the angled-off ends 27 are snapped together with the hooks 28.

This pre-assembled component is then mounted between two elements 30, 31 of a housing, which receive the clamping edge 19 of the base plate between them, and a gasket ring is also inserted. Housing element 30 is provided with an inflow connector, which is connected with an engine outlet, so that coolant flowing from the internal combustion engine flows to the thermostatic valve in the direction of arrow 32. Housing element 30 is further provided with a bypass connector 33, through which the coolant flows back to the internal combustion engine in the direction of arrow 34, as long as the thermostatic valve remains closed. Housing element 30 is provided with a sliding gasket ring 35, which rests against the exterior circumference of the annular slide 15 in the area facing away from gasket seat 17 and thus blocks the connection with the openings in the base plate 10.

When the in-flowing coolant has been sufficiently heated, so that the reaction temperature of thermostatic operating element 13 has been reached, work piston 12 of thermostatic operating element 13 is driven out of housing 14, so that the annular slide 16 is lifted off gasket seat 17. Because of this the coolant can flow axially through the interior of annular slide 15 and flow off to a coolant radiator in the direction of arrow 36 through the openings in the base plate 10. The position of the annular slide determines the ratio of the amount of coolant flowing through the bypass (arrow 34), directly to the engine, to the amount flowing to the coolant radiator (arrow 36) before returning to the internal combustion engine. During a purely cooling operation, work piston 12 is extended sufficiently far that annular slide 15 blocks bypass connector 33, and the entire amount of coolant flows to the coolant radiator.

In the embodiment represented, base plate 10 is a shaped metal element, and particularly a die-cast element. Annular slide 15 and shackle 25 are shaped sheet metal elements. In another embodiment, base plate 10 is likewise a shaped sheet metal element. In still other embodiments, base plate 10, annular slide 15, or shackle 25, or any combination of them, are made of plastic.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A thermostatic valve, comprising:
   a base plate, comprising a gasket seat, a clamping edge, at least one aperture between the clamping edge and the gasket seat, and at least one shoulder comprising an open hook;
   a slide assembly, comprising an axially open annular slide with a sealing edge, and comprising a thermostatic operating element for displacing the annular slide into and out of engagement of the sealing edge with the gasket seat;
   a shackle comprising at least one leg extending inside the annular slide into engagement with the at least one shoulder and comprising a biasing abutment; and
   a restoring spring extending between the abutment and the annular slide.

2. The thermostatic valve of claim 1, wherein the shackle comprises a collar adapted to guide the thermostatic operating element.

3. The thermostatic valve of claim 1, further comprising at least one connecting strip projecting radially inward from an end of the annular slide to a holder for fixedly mounting the annular slide to a housing of the thermostatic operating element.

4. The thermostatic valve of claim 3, wherein the holder comprises a circumferential ring supported on an annular shoulder of the housing.

5. The thermostatic valve of claim 1, wherein the base plate is substantially bowl-shaped and arches toward the thermostatic operating element.

6. The thermostatic valve of claim 1, wherein the base plate comprises at least one connecting strip supporting the clamping edge and adjoining a center area of the base plate.

* * * * *